UNITED STATES PATENT OFFICE.

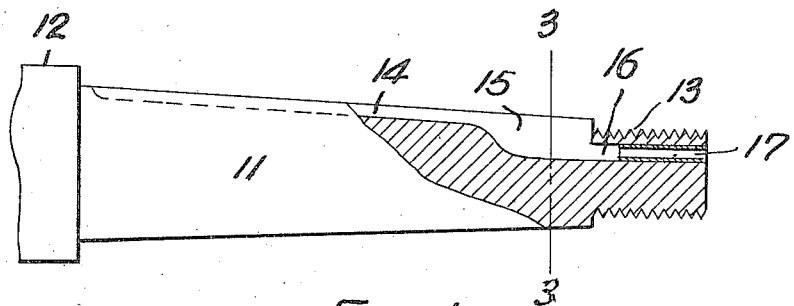
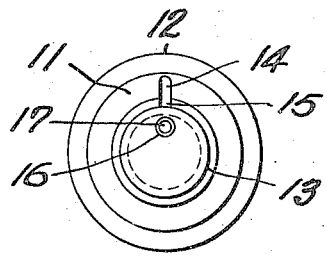
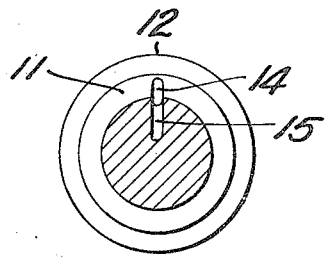
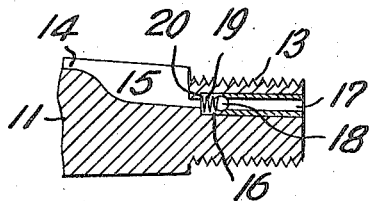
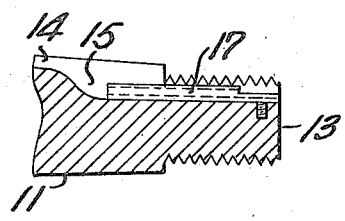

JAMES J. CARNEY, OF BETHEL, VERMONT.

SELF-LUBRICATING AXLE.

1,264,896.　　　　　　　　Specification of Letters Patent.　　　Patented May 7, 1918.

Application filed July 26, 1915, Serial No. 42,044. Renewed September 24, 1917. Serial No. 193,015.

*To all whom it may concern:*

Be it known that I, JAMES J. CARNEY, a citizen of the United States, and resident of Bethel, in the State of Vermont and United States of America, have invented certain new and useful Improvements in Self-Lubricating Axles, of which the following is a full, clear, and exact description.

This invention relates to improvements in self lubricating axles for vehicles, and the object of the invention is to provide a simple and inexpensive device, by means of which a quantity of lubricant may be injected into and retained in the axle for the lubrication of the wheel during a considerable period of time.

The device consists essentially of an axle having a slot extending from the shoulder of the bearing portion and deepened adjacent the thread, communicating with a bore formed under the threads.

In the drawings which illustrate the invention:—

Figure 1 is a longitudinal section of the axle.

Fig. 2 is an end elevation.

Fig. 3 is a section on the line 3—3, Fig. 1.

Fig. 4 is a partial sectional view showing the device equipped with a valve to prevent escape of the lubricant.

Fig. 5 shows a slight modification of the device.

Referring more particularly to the drawings, 11 designates the bearing portion of an axle which may be straight or tapered, as shown, and which terminates at one end in a shoulder 12 and at the opposite end in a reduced threaded portion 13, for the reception of a wheel retaining nut (not shown). The axle is provided on its upper surface with a groove 14 which extends from the shoulder to the threaded portion 13, and which is deepened, as shown at 15, adjacent the threaded portion. A bore 16 is formed in the threaded portion of the axle parallel with the axis thereof, and at such depth that it will pass clear of the threads and communicate with the deepened portion 15 of the groove or channel. A small tube 17 is inserted in this bore.

In order to prevent escape of lubricant through the tube 17, the inner end of the same may be provided with a ball or plug valve 18, which is normally pressed against the end of the tube to maintain this end closed by a suitable spring 19 seated against a shoulder 20 of the bore, or otherwise, as desired.

In Fig. 5, a slight modification has been shown in which the channel is extended completely through the threaded portion, and is of such depth that the tube 17 will be clear of the threads of a nut when the same is applied. In this form, it is preferable to have the tube 17 of such length that it will pass beyond the nut into the deepened portion of the channel. It will be obvious that a valve such as shown in Fig. 4 may be applied to the device shown in Fig. 5, and that a number of minor changes may be made in the invention, as necessitated by the particular form of axle to which it is applied, without departing from the spirit of the invention.

When a wheel is placed on the axle, it closes the top of the groove 14. The tube 17 is unobstructed by a nut retaining the wheel, and the nozzle of a grease gun may therefore be introduced into the tube to inject sufficient lubricant to completely fill the groove 14 from end to end. In the case of a thin lubricant which would rapidly work out, a valve such as shown in Fig. 4 will be found advisable, but where a lubricant of heavy consistency is employed, this will not always be necessary.

Having thus described my invention, what I claim is:—

1. In a device of the character described, an axle having the bearing portion thereof terminating at one end in a shoulder and at the opposite end in a reduced threaded portion, a channel formed in said axle extending from the shoulder to the threaded portion thereof and deepened adjacent the threaded portion, and a tube extending through the threaded portion clear of the threads and communicating with the deepened portion of the channel.

2. In a device of the character described, an axle having the bearing portion thereof terminating at one end in a shoulder and at the opposite end in a threaded portion, a channel formed throughout the length of the bearing portion of said axle and deepened adjacent the threaded portion, a bore formed through the threaded portion of the axle clear of the threads and communicating with the deepened portion of the channel, and a tube inserted in said bore.

3. In a device of the character described, an axle having the bearing portion thereof terminating at one end in a shoulder and at the opposite end in a threaded portion, a channel formed in said axle extending from the shoulder clear to the end of the threaded portion, a tube inserted in said channel traversing the threaded portion clear of the threads thereof, and a valve arranged to hold lubricant against reverse flow in the tube.

In witness whereof, I have hereunto set my hand, in presence of two witnesses.

JAMES J. CARNEY.

Witnesses:
GUY WILSON,
PAUL F. WILSON.

Copies of this patent may be obtained for five cents each, by addressing the "Commissioner of Patents, Washington, D. C."